(12) United States Patent
Phillips

(10) Patent No.: US 8,613,392 B2
(45) Date of Patent: Dec. 24, 2013

(54) SUPER-CASING FOR CONTACTLESS READER

(75) Inventor: Simon Phillips, York (GB)

(73) Assignee: MasterCard International Incorporated, Purchase, NY (US)

(*) Notice: Subject to any disclaimer, the term of this patent is extended or adjusted under 35 U.S.C. 154(b) by 49 days.

(21) Appl. No.: 13/333,212

(22) Filed: Dec. 21, 2011

(65) Prior Publication Data

US 2012/0168503 A1 Jul. 5, 2012

Related U.S. Application Data

(60) Provisional application No. 61/429,324, filed on Jan. 3, 2011.

(51) Int. Cl.
*G06K 7/00* (2006.01)
*G06K 15/00* (2006.01)
*G06K 7/08* (2006.01)

(52) U.S. Cl.
USPC ............................ 235/439; 235/383; 235/451

(58) Field of Classification Search
USPC .......................... 235/379, 383, 435, 439, 451
See application file for complete search history.

(56) References Cited

U.S. PATENT DOCUMENTS 6,296,182 B1* 10/2001 Ota et al. ...................... 235/379

* cited by examiner

*Primary Examiner* — Jamara Franklin
(74) *Attorney, Agent, or Firm* — Buckley, Maschoff & Talwalkar LLC

(57) ABSTRACT

A contactless reader includes a housing with a front wall oriented to face users of contactless identification tokens. The front wall has an outer surface that bears a first indicia indicating a location at which the contactless identification tokens are to be presented. The contactless reader also includes an antenna and electronic components within the housing for wirelessly sending data to and receiving data from contactless identification tokens. In addition, a casing is provided that attaches to the housing to cover the front wall of the housing and to cover the first indicia, wherein the casing has an outer surface bearing a second indicia that indicates the location at which the contactless identification tokens are to be presented.

14 Claims, 9 Drawing Sheets

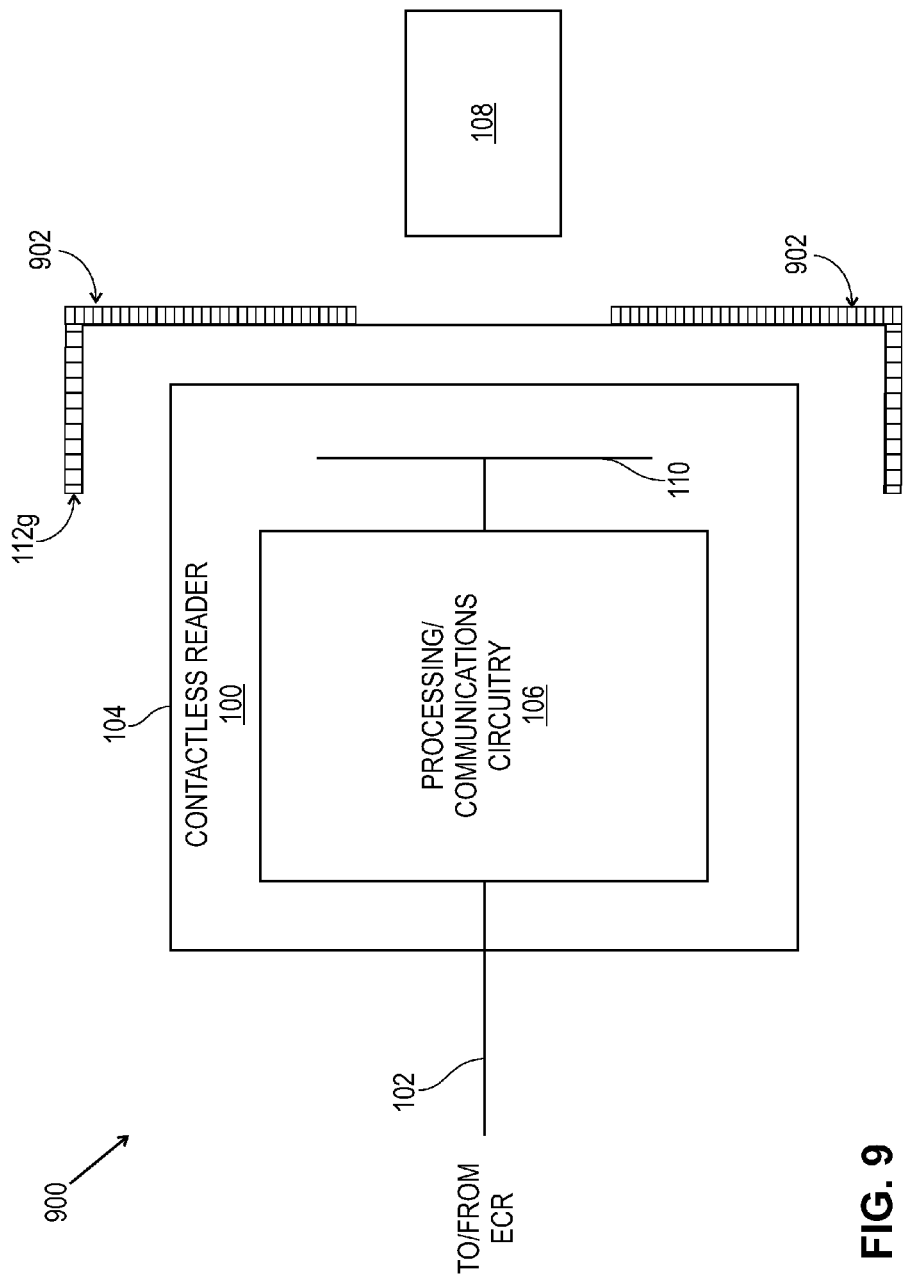

US 8,613,392 B2

SUPER-CASING FOR CONTACTLESS READER

BACKGROUND

Payment cards such as credit or debit cards are ubiquitous. For decades, such cards have included a magnetic stripe on which the relevant account number is stored. To consummate a purchase transaction with such a card, the card is swiped through a magnetic stripe reader that is part of a point of sale (POS) terminal. The reader reads the account number from the magnetic stripe. The account number is then used to route a transaction authorization request that is initiated by the POS terminal.

In pursuit of still greater convenience and more rapid transactions at POS terminals, payment cards have more recently been developed that allow the account number to be automatically read from the card by radio frequency communication between the card and a so-called "proximity reader" which may be incorporated with the POS terminal. In such cards, often referred to as "proximity payment cards" or "contactless payment cards", a radio frequency identification (RFID) integrated circuit (IC, often referred to as a "chip") is embedded in the card body. A suitable antenna is also embedded in the card body and is connected to the RFID chip to allow the chip to receive and transmit data by RF communication via the antenna. In typical arrangements, the RFID chip is powered from an interrogation signal that is transmitted by the proximity reader and received by the card antenna.

MasterCard International Incorporated, the assignee hereof, has established a widely-used standard, known as "PayPass", for interoperability of contactless payment cards and proximity readers. It has also been proposed to use wireless exchanges of information via NFC (Near Field Communication) for payment applications.

In order for the contactless payment cards to be read at the point of sale, suitable contactless reader devices (referred to above as "proximity readers") are provided as peripheral devices for the electronic cash registers (ECRs) or other types of terminals that serve as point of sale (POS) terminals.

It has also been proposed to incorporate the functionality of contactless payment cards into mobile telephones, so that users may present payment-enabled mobile telephones for reading by contactless readers as an alternative to presenting contactless payment cards.

The exterior appearance or design of most, if not all, standard contactless readers tends toward the basic, and typically takes the form of a black plastic box, with perhaps a minimal amount of (often unattractive) styling or ornamentation. This presents a disadvantage for some retailers, especially for those who invest significantly in the aesthetic design and attractive appearance of their stores. Indeed, for some retailers, store design is an integral part of their brand strategy. For such retailers it is difficult to reconcile the somewhat unattractive appearance of the typical contactless reader with their store design objectives, particularly given the need to place contactless readers in prominent locations at checkout counters where the readers can be easily accessed by customers who wish to present their contactless payment cards.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein:

FIG. 9 is a view that is similar to FIG. 1, except that in the case of FIG. 9, the contactless payment card reader has been retro-fitted, in accordance with other aspects of the invention, to minimize its susceptibility to electromagnetic interference.

DETAILED DESCRIPTION

Figure 1:
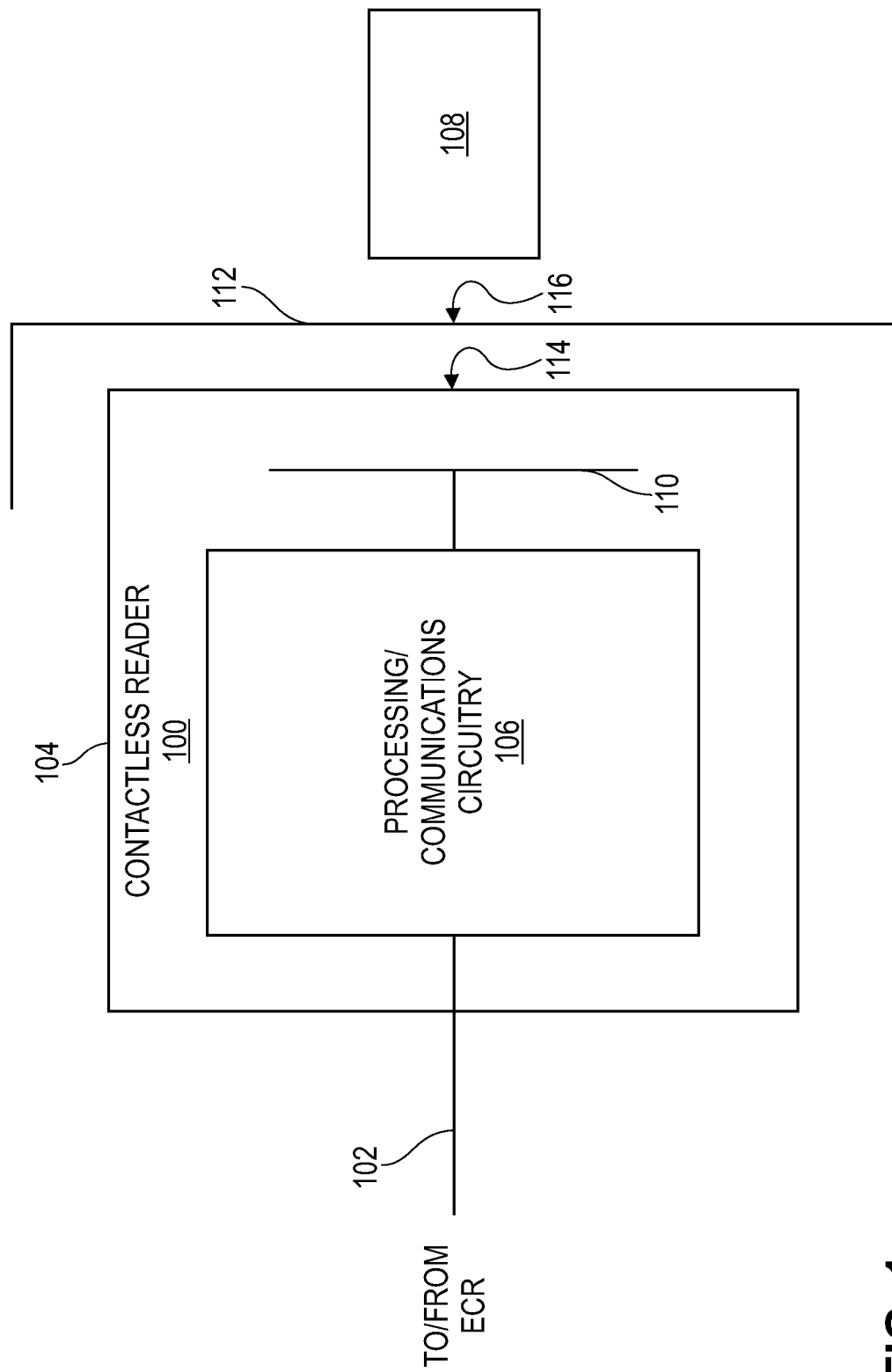
FIG. 1 schematically illustrates an installation of a conventional contactless payment card reader that has been the subject of an aesthetic retro-fit in accordance with aspects of the present invention.

FIG. 1 is a block diagram that schematically illustrates an installation of a conventional contactless payment card reader 100 that has been the subject of an aesthetic retro-fit in accordance with an embodiment. The contactless payment card reader 100 may, for example, be any one of a number of standard contactless payment card readers of the type typically interfaced as peripheral devices to electronic cash registers (ECRs) or other types of point of sale (POS) terminals. In FIG. 1, reference numeral 102 schematically represents a cable that connects the contactless payment card reader 100 with an ECR. It should be understood, however, that in some embodiments the contactless payment card reader 100 is instead wirelessly connected to an ECR.

The contactless payment card reader 100 includes a conventional plastic housing that contains conventional electronic circuitry 106 for interrogating and reading (exchanging data communications with) contactless payment cards (of which one is shown at 108). As is also conventional, the electronic circuitry 106 may be coupled to an antenna 110, from which interrogation signals are transmitted to the contactless payment card 108, and through which data communications are wirelessly received from the contactless payment card 108. As is also customary, the data communications received by the electronic circuitry 106, via the antenna 110, and from the contactless payment card reader 100, may include a signal or data that indicates a payment card account number that is stored in the contactless payment card 108.

Also schematically shown in FIG. 1 is a retro-fit casing 112 that, in some embodiments, is snapped on to (or otherwise secured to) the housing 104 of the contactless payment card reader 100 for the purpose of upgrading the aesthetic appeal of the contactless payment card reader 100. In particular, it should be understood that the retro-fit casing 112 may be connected or adhered to the housing of the card reader 100 by using a peel-able adhesive, double-sided tape, a hook and loop fastener, or some other adhesive or fastener.

Figure 2:
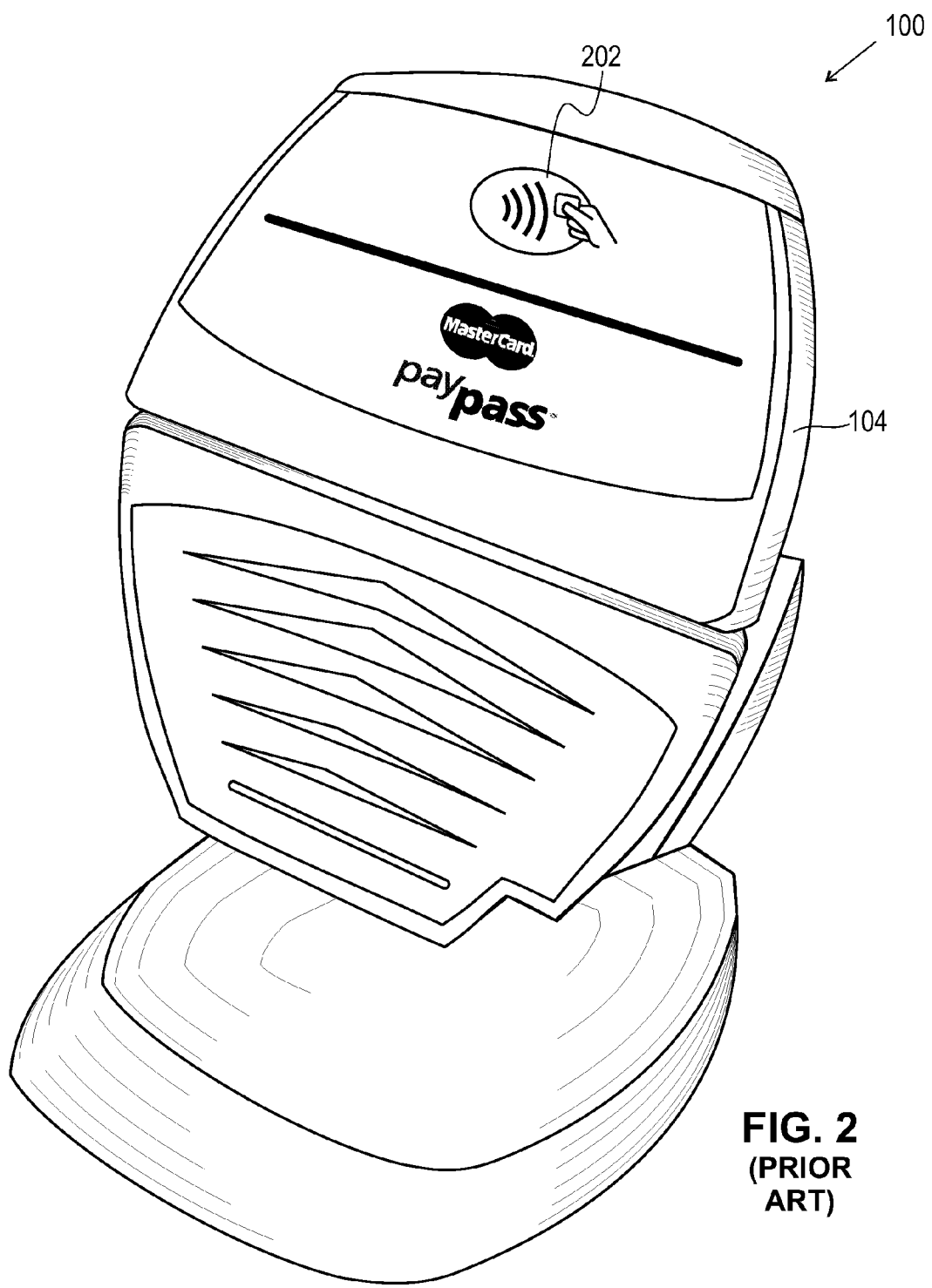
FIG. 2 is a perspective view of a typical conventional contactless reader prior to being retro-fitted in accordance with the present invention.

FIG. 2 is a perspective view of the contactless payment card reader 100 as it may have appeared prior to the installation of the retro-fit casing 112. It will be appreciated that the main portion of the contactless payment card reader 100 that is visible in FIG. 2 is the housing 104. One notable feature of the housing 104 is that it bears indicia 202 that may be in the form of a standard logo for indicating the location at which the contactless payment card 108 (not shown in FIG. 2) is to be presented to the contactless payment card reader 100. That is, the locus of the indicia 202 may (referring to FIG. 1) be at 114, which is adjacent to the locus (inside the housing 104) of the antenna 110. Thus, the indicia 202 alerts or notifies a user or consumer of the location where the contactless payment card 108 should be presented or tapped to initiate a transaction.

FIGS. 3-8 show various views of a variety of snap-on or otherwise attachable casings that may be used for aesthetic retro-fitting, in accordance with some embodiments, of standard contactless readers.

Figure 3:
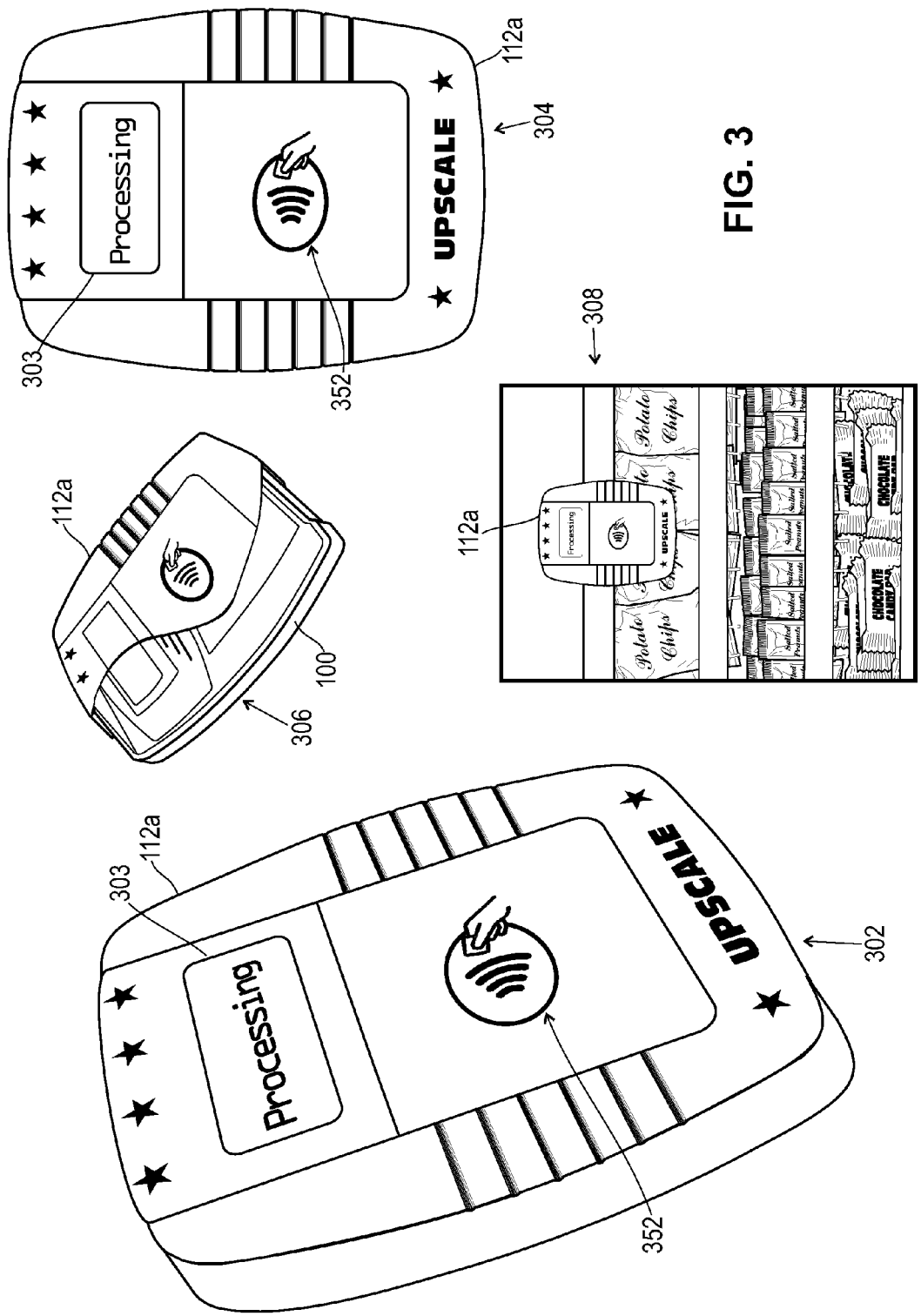
FIGS. 3-8 show various perspective and front views of a variety of snap-on casings that may be used for aesthetic retro-fitting, in accordance with aspects of the invention, of standard contactless readers.

Referring first to FIG. 3, portion 302 of the drawing is a perspective view of an embodiment 112a of the above-mentioned retro-fit casing 112, and portion 304 shows a front elevation view of the retro-fit casing embodiment 112a. As shown, a window portion 303 of the retro-fit casing 112a is positioned such that a display screen of the underlying contactless payment card reader 100 can be seen by the user and/or operator, which in this case reads "Processing". Portion 306 of FIG. 3 shows the retro-fit casing embodiment 112a partially broken away to reveal the contactless payment card reader 100 on which the retro-fit casing embodiment 112a has been installed. Portion 308 of FIG. 3 shows the retro-fit casing embodiment 112a as seen in context near a checkout counter and next to a display of snack-food items.

A notable feature of the retro-fit casing embodiment 112a is that it bears the same standard "tap-your-contactless-card-here" logo/indicia (indicated by reference numeral 352 in FIG. 3) as the housing 104 of the contactless payment card reader 100 (see FIG. 2, item 202). The locus of the indicia 352 on the retro-fit casing 112 may be at the place indicated by reference numeral 116 in FIG. 1 (i.e., at a location that corresponds to the locus 114 (FIG. 1) of the indicia 202 (FIG. 2) and corresponding to the locus of the antenna 110 (FIG. 1) of the contactless payment card reader 100). It will be appreciated that when the retro-fit casing 112 is installed on the housing 104, the indicia 202 on the housing 104 is concealed, while the indicia 352 on the retro-fit casing 112a is visible to the customers/users and hence performs the same function as the now-hidden indicia 202, that is notifying or alerting a user or consumer of the location (at indicia 352) to tap or wave his or her contactless payment card 108 to initiate a transaction.

Figure 4:
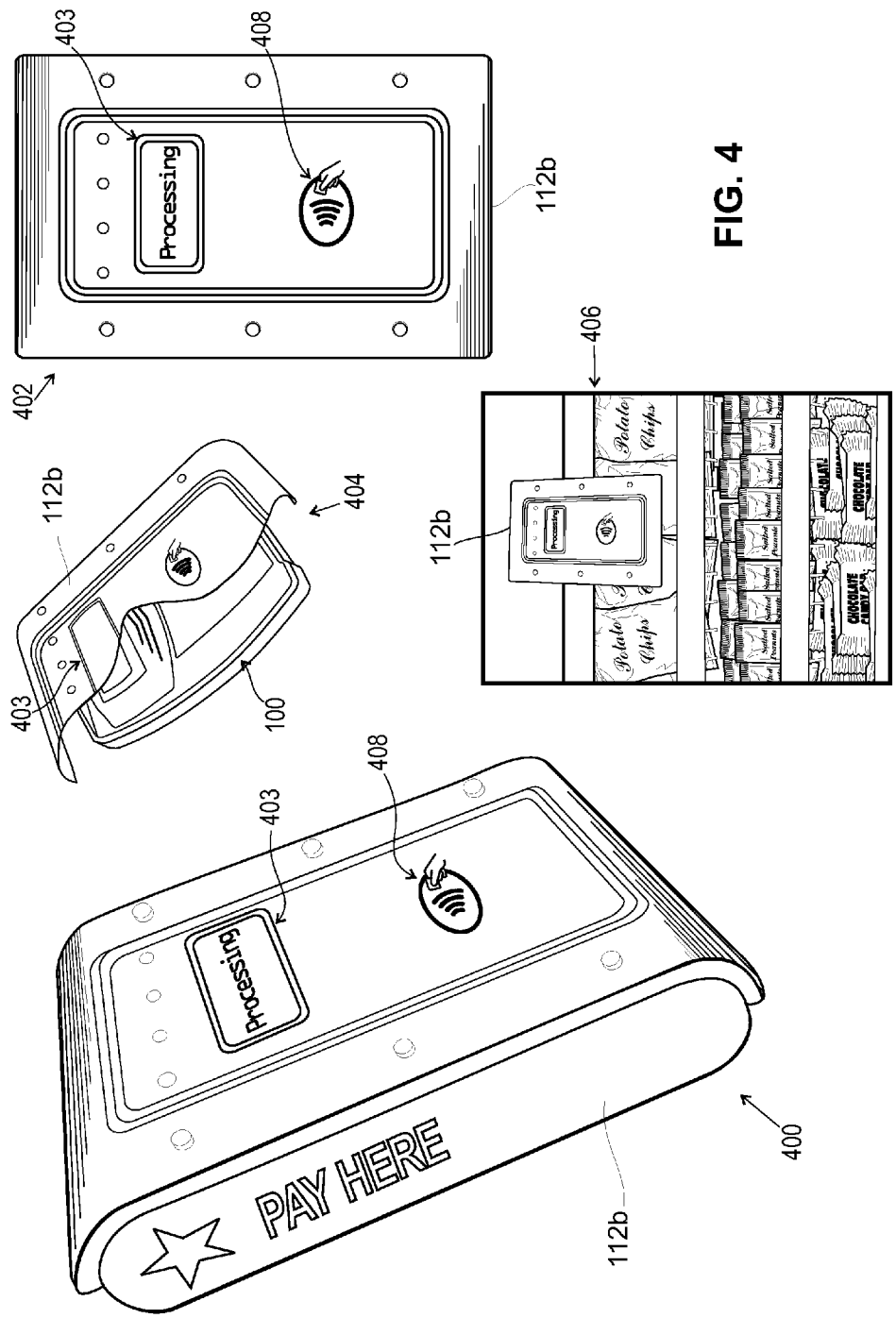

FIG. 4 shows several views of a generally rectangular casing similar to the casing shown in FIG. 3, except that FIG. 4 shows an alternative embodiment 112b of the retro-fit casing 112. In particular, the portion 400 of the drawing is a perspective view of an embodiment 112b of the above-mentioned retro-fit casing 112, and portion 402 shows a front elevation view of the retro-fit casing embodiment 112b. As shown, a window portion 403 of the retro-fit casing 112b is positioned such that a display screen of the underlying contactless payment card reader 100 can be seen by the user and/or operator, which in this case reads "Processing". Also shown in FIG. 4 is a cutaway portion view 404 of the retro-fit casing embodiment 112b to reveal the contactless payment card reader 100 underneath, upon which the retro-fit casing embodiment 112b has been installed. Portion 406 of FIG. 4 shows the retro-fit casing embodiment 112b in context near a checkout counter of a retail store.

The retro-fit casing embodiment 112b bears the standard "tap-your-contactless-card-here" logo/indicia (indicated by reference numeral 408 in FIG. 4) as the housing 104 of the contactless payment card reader 100 (see FIG. 2, item 202). The locus of the indicia 408 on the retro-fit casing 112b may be positioned at or near the place indicated by reference numeral 116 in FIG. 1 (i.e., at a location that corresponds to the locus 114 (FIG. 1) of the indicia 202 (FIG. 2) and corresponding to the locus of the antenna 110 (FIG. 1) of the contactless payment card reader 100). Therefore, when the retro-fit casing 112b is installed on the housing 104, the indicia 202 on the housing 104 is concealed, while the indicia 408 on the retro-fit casing 112b is visible to the customers/users and thus performs the same function as the now-hidden indicia 202.

Figure 5:
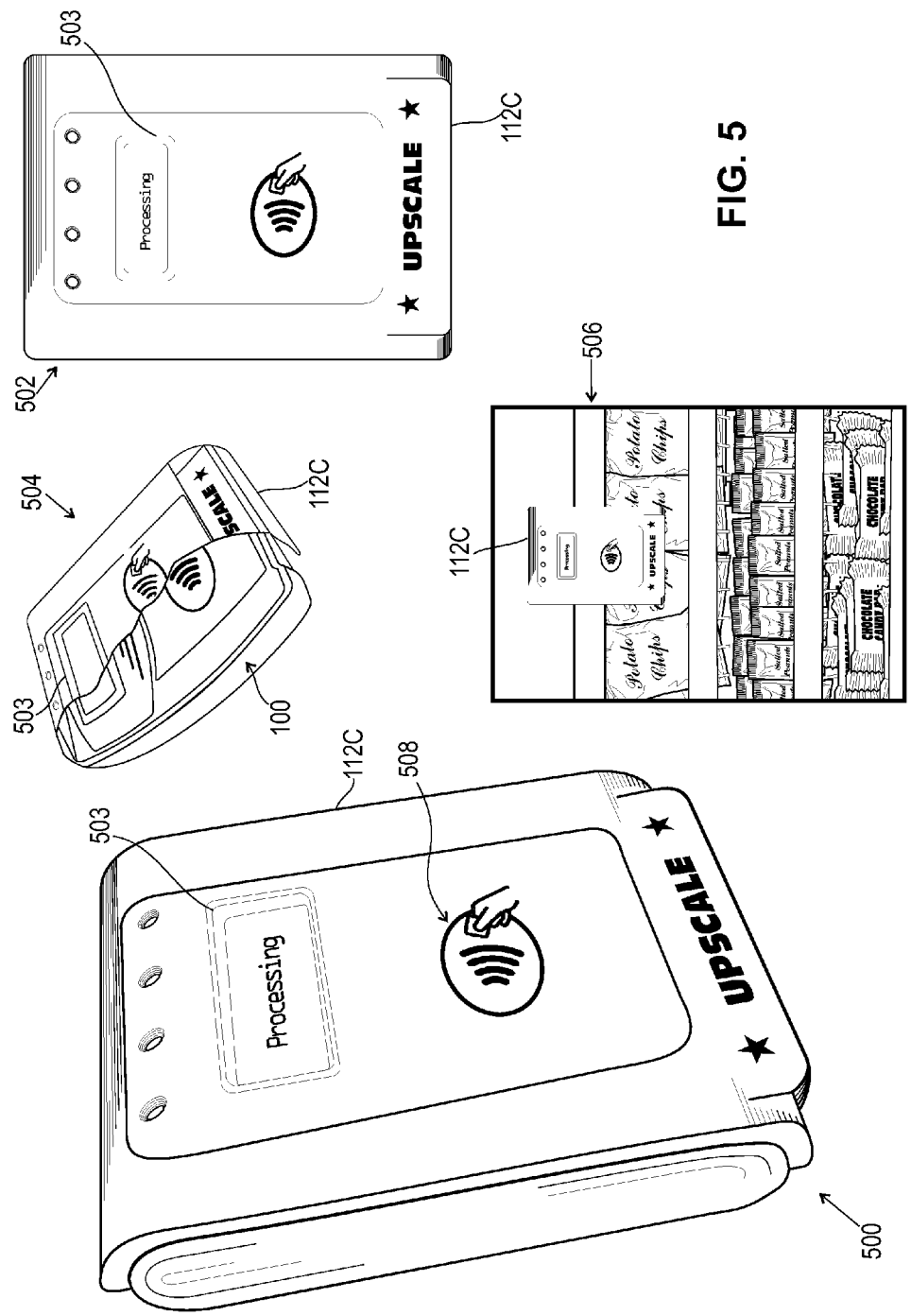

FIG. 5 shows several views of a generally rectangular casing similar to the casing shown in FIG. 4 or in FIG. 3, except that FIG. 5 shows an alternative embodiment 112c of the retro-fit casing 112. In particular, the portion 500 of the drawing is a perspective view of an embodiment 112c of the above-mentioned retro-fit casing 112, and portion 502 shows a front elevation view of the retro-fit casing embodiment 112c. As shown, a window portion 503 of the retro-fit casing 112c is positioned such that a display screen of the underlying contactless payment card reader 100 can be seen by the user and/or operator, which in this case reads "Processing". Also shown in FIG. 5 is a cutaway portion view 504 of the retro-fit casing embodiment 112c to reveal the contactless payment card reader 100 underneath, upon which the retro-fit casing embodiment 112c has been installed. Portion 506 of FIG. 5 shows the retro-fit casing embodiment 112c in context near a checkout counter of a retail store.

The retro-fit casing embodiment 112c bears the standard "tap-your-contactless-card-here" logo/indicia (indicated by reference numeral 508 in FIG. 5) as the housing 104 of the contactless payment card reader 100 (see FIG. 2, item 202). The locus of the indicia 508 on the retro-fit casing 112c may be positioned at or near the place indicated by reference numeral 116 in FIG. 1 (i.e., at a location that corresponds to the locus 114 (FIG. 1) of the indicia 202 (FIG. 2) and corresponding to the locus of the antenna 110 (FIG. 1) of the contactless payment card reader 100). Therefore, when the retro-fit casing 112c is installed on the housing 104, the indicia 202 on the housing 104 is concealed, while the indicia 508 on the retro-fit casing 112c is visible to the customers/users and thus performs the same function as the now-hidden indicia 202.

Figure 6:
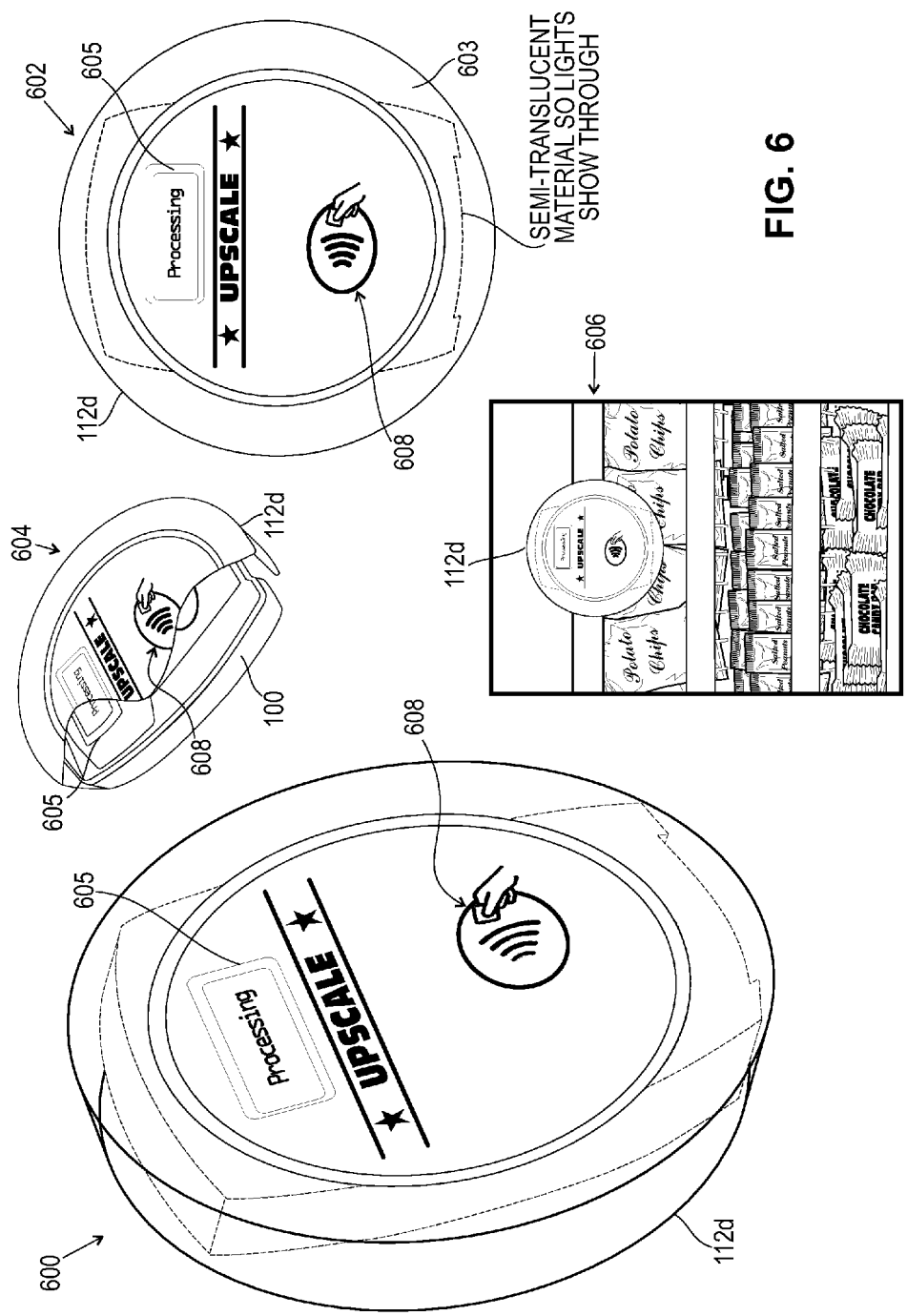

FIG. 6 shows several views of a circularly-shaped casing similar to the casing shown in FIGS. 3-5, except that FIG. 6 shows an alternative embodiment 112d of the retro-fit casing 112. In particular, the portion 600 of the drawing is a perspective view of an embodiment 112d of the above-mentioned retro-fit casing 112, and portion 602 shows a front elevation view of the retro-fit casing embodiment 112d. The outer ring area 603 of the retro-fit casing 112d may be composed of a semi-translucent or translucent material so that any lights present underneath the casing can show through. For example, if the front face area of the card reader 100 includes an array of LED lights that are located beneath the outer ring area 603 when the retro-fit casing is installed, and the LED lights illuminate during the processing of a transaction, then the translucent material of the outer ring area 603 will permit light from the LED lights to be visible to a customer and/or operator. In addition, as shown, a window portion 605 of the retro-fit casing 112d is positioned such that a display screen of the underlying contactless payment card reader 100 can be seen by the user and/or operator, which in this case reads "Processing".

Also shown in FIG. 6 is a cutaway portion view 604 of the retro-fit casing embodiment 112d to reveal the contactless payment card reader 100 underneath, upon which the retro-fit casing embodiment 112d has been installed. Portion 606 of FIG. 6 shows the retro-fit casing embodiment 112d in context near a checkout counter of a retail store.

The retro-fit casing embodiment 112d bears the standard "tap-your-contactless-card-here" logo/indicia (indicated by reference numeral 608 in FIG. 6) as the housing 104 of the contactless payment card reader 100 (see FIG. 2, item 202).

The locus of the indicia 608 on the retro-fit casing 112d may be positioned at or near the place indicated by reference numeral 116 in FIG. 1 (i.e., at a location that corresponds to the locus 114 (FIG. 1) of the indicia 202 (FIG. 2) and corresponding to the locus of the antenna 110 (FIG. 1) of the contactless payment card reader 100). Therefore, when the retro-fit casing 112d is installed on the housing 104, the indicia 202 on the housing 104 is concealed, while the indicia 608 on the retro-fit casing 112d is visible to the customers/users and thus performs the same function as the now-hidden indicia 202.

Figure 7:
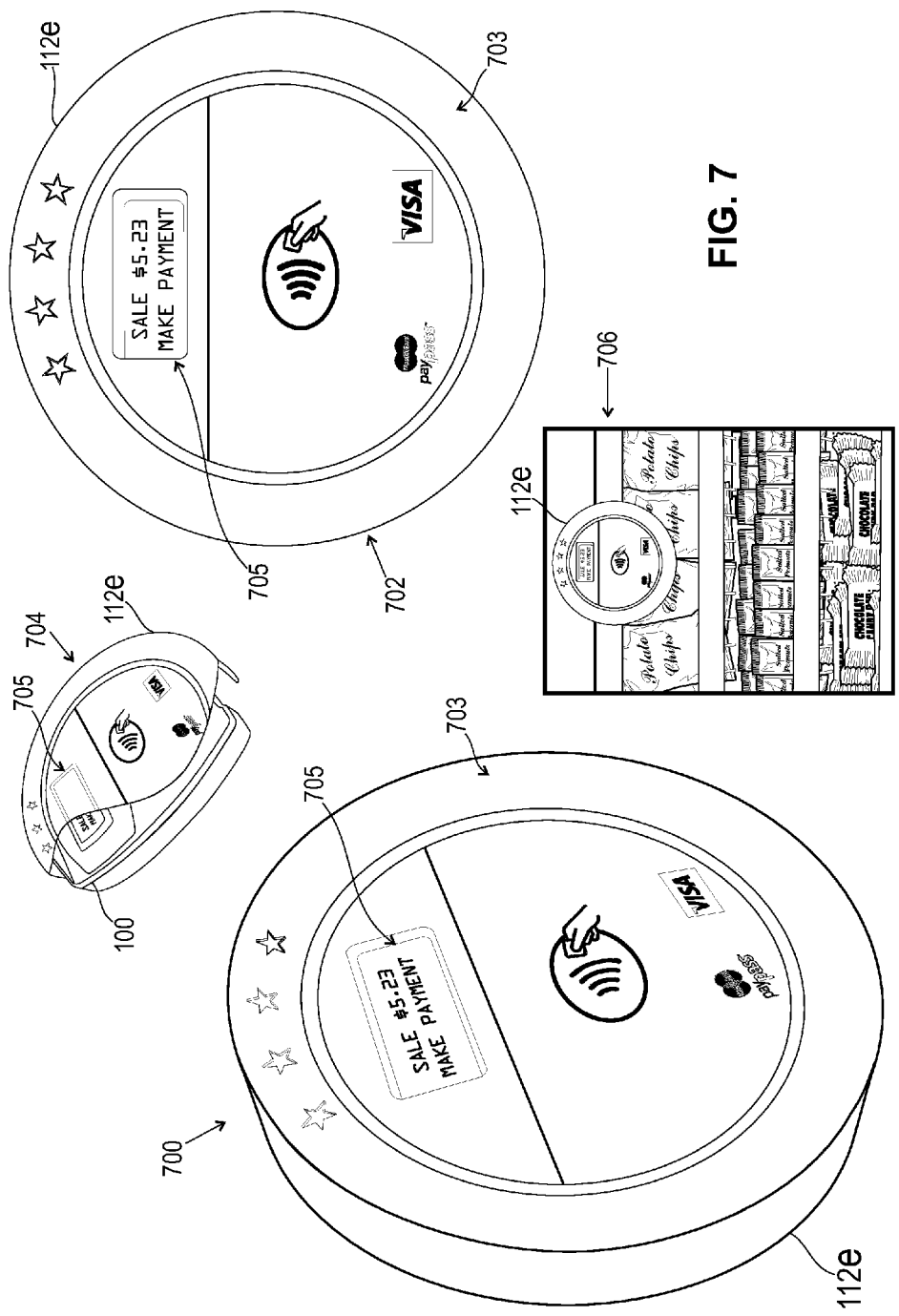

FIG. 7 shows several views of a circularly-shaped casing similar to the casing shown in FIG. 6, except that FIG. 7 shows an alternative embodiment 112e of the retro-fit casing 112. In particular, the portion 700 of the drawing is a perspective view of an embodiment 112e of the above-mentioned retro-fit casing 112, and portion 702 shows a front elevation view of the retro-fit casing embodiment 112e. As shown, a window portion 705 of the retro-fit casing 112e is positioned such that a display screen of the underlying contactless payment card reader 100 can be seen by the user and/or operator, which in this case reads "Sale $5.23—Make Payment". In addition, the outer ring area 703 of the retro-fit casing 112e may be composed of an opaque material so that any lights present underneath the retro-fit casing will not show through. However, the outer ring area 703 may include one or more translucent portions, for example, so that if the front face area of the card reader 100 includes one or more LED lights then when those LED lights are illuminated then the light will be visible through the translucent portions to a customer and/or operator.

Also shown in FIG. 7 is a cutaway portion view 704 of the retro-fit casing embodiment 112e to reveal the contactless payment card reader 100 underneath, upon which the retro-fit casing embodiment 112e has been installed. Portion 706 of FIG. 7 shows the retro-fit casing embodiment 112e in context near a checkout counter of a retail store.

The retro-fit casing embodiment 112e bears the standard "tap-your-contactless-card-here" logo/indicia (indicated by reference numeral 708 in FIG. 7) as the housing 104 of the contactless payment card reader 100 (see FIG. 2, item 202). The locus of the indicia 708 on the retro-fit casing 112e may be positioned at or near the place indicated by reference numeral 116 in FIG. 1 (i.e., at a location that corresponds to the locus 114 (FIG. 1) of the indicia 202 (FIG. 2) and corresponding to the locus of the antenna 110 (FIG. 1) of the contactless payment card reader 100). Therefore, when the retro-fit casing 112e is installed on the housing 104, the indicia 202 on the housing 104 is concealed, while the indicia 708 on the retro-fit casing 112e is visible to the customers/users and thus performs the same function as the now-hidden indicia 202.

Figure 8:
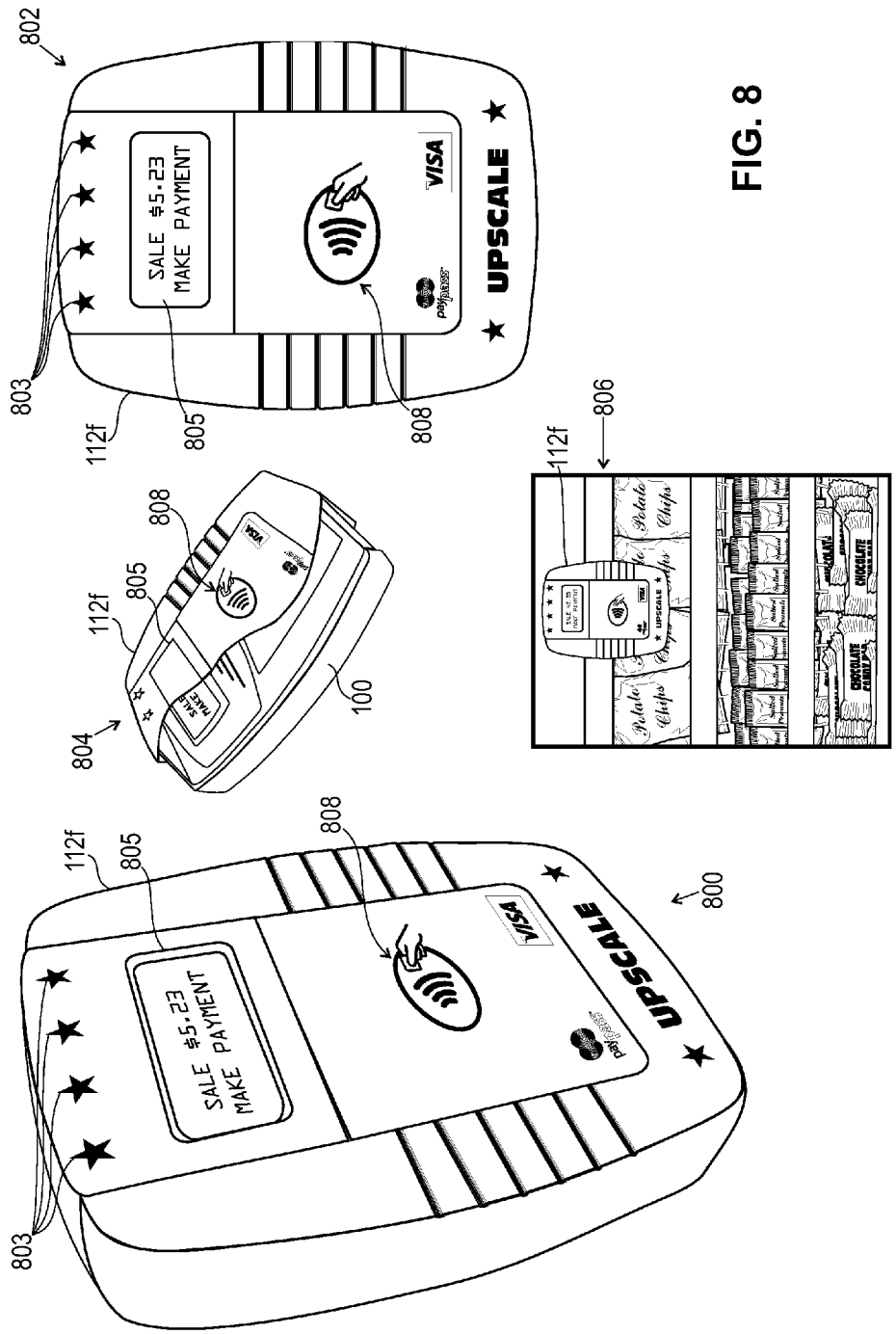

FIG. 8 illustrates a generally rectangular retro-fit casing that is similar to the retro-fit casing of FIGS. 3-7, except that FIG. 8 shows an alternative embodiment 112f of the retro-fit casing 112. In particular, the portion 800 of the drawing is a perspective view of an embodiment 112f of the above-mentioned retro-fit casing 112, and portion 802 shows a front elevation view of the retro-fit casing embodiment 112f. As shown, a window portion 805 of the retro-fit casing 112f is positioned such that a display screen of the underlying contactless payment card reader 100 can be seen by the user and/or operator, which in this case reads "Sale $5.23—Make Payment". In addition, the upper portion of the retrofit casing 112f may include a plurality of apertures 803 in the casing so that any light from a light source of the housing (which would be present underneath the retro-fit casing) will be permitted to escape the casing (i.e., show through the casing). For example, if the top portion of the front face area of the card reader 100 includes one or more LED-type lights, then when one or more of those LED lights are illuminated the light will be visible through the apertures 803 to a customer and/or to an operator.

Also shown in FIG. 8 is a cutaway portion view 804 of the retro-fit casing embodiment 112f to reveal the contactless payment card reader 100 underneath, upon which the retro-fit casing embodiment 112f has been installed. Portion 806 of FIG. 8 shows the retro-fit casing embodiment 112f in context near a checkout counter of a retail store.

The retro-fit casing embodiment 112f also bears the standard "tap-your-contactless-card-here" logo/indicia (indicated by reference numeral 808 in FIG. 8) as the housing 104 of the contactless payment card reader 100 (see FIG. 2, item 202). The locus of the indicia 808 on the retro-fit casing 112f may be positioned at or near the place indicated by reference numeral 116 in FIG. 1 (i.e., at a location that corresponds to the locus 114 (FIG. 1) of the indicia 202 (FIG. 2) and corresponding to the locus of the antenna 110 (FIG. 1) of the contactless payment card reader 100). Therefore, when the retro-fit casing 112f is installed on the housing 104, the indicia 202 on the housing 104 is concealed, while the indicia 808 on the retro-fit casing 112f is visible to the customers/users and thus performs the same function as the now-hidden indicia 202.

One thing that all of the embodiments of the retro-fit casings discussed above have in common is that all may be much more aesthetically appealing and/or more consonant with a retail store's design approach than the customary black plastic box which forms the housing of most standard contactless card readers.

In addition to their aesthetic design features, at least some embodiments of the retro-fit casing 112 may include functional elements or active elements such as one or more display lights and/or a sounder and/or a speaker (an audio/visual component). These items may perform the same functions as such devices conventionally provided on the front surface of a standard contactless payment card reader. That is, they may indicate to the user (for example, by flashing and/or beeping) that the contactless payment card reader has performed an action such as reading a card that has been presented to it, and/or is processing a transaction. These active elements on the casing may be actuated by circuitry on the casing that detects corresponding output from such devices on the housing of the contactless payment card reader itself. Thus the active elements on the casing may relay or echo or amplify the output of corresponding elements on the reader housing. For example, a speaker located on the casing may emit a series of high-frequency sounds that correspond to the sounds that the proximity card reader emits when a purchase transaction is being processed. The retro-fit casing may include a battery to serve as the power supply for active elements in the casing, or alternatively the retro-fit casing may include or be associated with a power supply that plugs into a wall outlet. In some embodiments, the active elements may represent an upgrade relative to the corresponding elements on the contactless payment card reader itself, by, e.g., being brighter, louder, more colorful and/or more in keeping with the store's design concept.

In some embodiments, the retro-fit casing may be secured to the contactless payment card reader other than by being snapped on to the housing of the contactless payment card reader. For example, the casing may be secured to the reader by adhesive, or by sliding on to the reader, or by having the reader dropped into the casing. In some embodiments, the casing is secured to the reader by using a peelable adhesive. The casing may have one of a number of different configurations as required to accommodate attachment in a manner as described. For example, the casing may be configured to protectively house the card reader.

In addition to or instead of the above-noted functions of aesthetic upgrade and/or inclusion of active elements, the casing may perform one or more other functions including splash- or water-proofing. For the latter functions, the casing may be rubberized or formed of gel, e.g., with a clear or translucent appearance but bearing suitable graphics. In some embodiments, a splash-proof casing may be provided to retro-fit a standard reader for use in a hostile environment such as near a swimming pool or in out-of-door locations.

Yet another function that may be performed by a retro-fit casing, according to aspects of the invention, is to shield or partially shield the reader electronics from electromagnetic interference. For example, it has been reported that contactless readers may face susceptibility to interference from operation of mobile telephones in retail stores. Accordingly, shielding may be utilized to address this issue, and the shielding may be incorporated into a retro-fit casing as indicated schematically at 902 in FIG. 9. FIG. 9 schematically illustrates an installation 900 of a conventional contactless payment card reader 100 that has been fitted with a retro-fit casing 112g according to an embodiment, wherein the shielding 902 on the casing 112g may be clear of the locus of where the contactless payment card 108 is to be presented to the contactless reader 100. This, the shielding 902 does not cover the area in front of the antenna 110 associated with the processing/communications circuitry 106, and the shielding 902 may be made of any suitable shielding material. In addition, the shielding 902 may be embedded in the casing 112g, rather than clad thereon as suggested by the drawing of FIG. 9.

Reverting again to the aesthetic functions potentially performed by the casing embodiments, it should be noted that similar aesthetic results may be obtained by custom-designing housings of contactless readers to match store design concepts and obtaining the cooperation of reader manufacturers in supplying readers with such custom-designed housings as original equipment in place of the standard black plastic designs. However, such cooperation often may not be readily forthcoming, or may not be cost-effective, in which situation it may be preferable to employ retro-fit casings as disclosed herein.

According to other aspects of the invention, an aesthetic retro-fit, via a snap-on casing or the like, may also be performed with respect to a magnetic-stripe card reader.

As used herein and in the appended claims, the term "identification token" should be understood to include contactless payment cards and other devices that wirelessly transmit identifying information, including but not limited to payment card account numbers.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A contactless reader comprising:
    a housing comprising a front wall oriented to face users of contactless identification tokens, the front wall having an outer surface with a first indicia indicating a location at which contactless identification tokens are to be presented;
    an antenna within the housing adjacent the first indicia for sending interrogation signals to, and receiving data from, the contactless identification tokens;
    electronic components within the housing and coupled to the antenna for wirelessly exchanging data communications with the contactless identification tokens; and
    a retro-fit casing configured for attachment to the housing to fully cover the front wall of the housing and to upgrade the aesthetic appeal of the contactless reader, the retro-fit casing having an outer surface bearing a second indicia positioned to cover the first indicia that indicates the location at which the contactless identification tokens are to be presented.

2. The reader of claim 1, further comprising a shielding material located at portions of the retro-fit casing, but not over an entire extent of the retro-fit casing, the shielding material for shielding, from electromagnetic signals, a portion of the front wall of the housing excluding the location at which the contactless identification tokens are to be presented.

3. The reader of claim 1, wherein the retro-fit casing further comprises at least one translucent or semi-translucent portion to permit light originating from the housing of the contactless reader to be viewed by a user.

4. The reader of claim 1, wherein the housing further comprises a display screen in the front wall, and wherein the retro-fit casing further comprises a window portion through a portion of the outer surface that is configured to overlay the display screen when the retro-fit casing is attached to the housing.

5. The reader of claim 1, wherein the retro-fit casing further comprises at least one aperture for permitting light originating from a light source of the housing to escape from the retro-fit casing.

6. The reader of claim 1, further comprising at least one active element on the retro-fit casing that at least one of relays, echoes and amplifies an output of a corresponding active element of the housing.

7. The reader of claim 1, wherein the retro-fit casing is waterproof.

8. A method comprising:
    providing a retro-fit casing to upgrade the aesthetic appeal of a contactless reader, the retro-fit casing comprising an outer surface having a first indicia indicating the location for a user to present a contactless identification token; and
    affixing the casing to fully cover a front wall of a housing of the contactless card reader such that the first indicia aligns with and overlays a second indicia on the front wall of the housing that is adjacent the locus of an antenna.

9. The method of claim 8, wherein the front wall of the housing of the contactless card reader includes a display and the outer surface of the retro-fit casing includes a window, so that affixing the casing to the housing further comprises aligning the window with the display.

10. The method of claim 8, wherein the retro-fit casing further comprises a shielding material located at portions of the outer surface excluding a portion about the first indicia, so that affixing the casing to the housing further comprises aligning shielding material to be clear of the second indicia.

11. The method of claim 8, wherein at least a portion of the outer surface of the retro-fit casing is at least one of translucent or semi-translucent to permit light originating from the housing of the contactless reader to be viewed by a user.

12. The method of claim 8, wherein at least a portion of the outer surface of the retro-fit casing includes at least one aperture for permitting light originating from a light source of the housing to escape from the retro-fit casing.

13. The method of claim 8, wherein the outer surface of the retro-fit casing includes at least one active element for at least one of relaying, echoing and amplifying an output of a corresponding active element of the housing.

14. The method of claim 8, wherein providing the retro-fit casing further comprises providing a waterproof casing to provide waterproofing of the contactless card reader.

* * * * *